United States Patent
Horiuchi et al.

(10) Patent No.: US 6,272,530 B1
(45) Date of Patent: *Aug. 7, 2001

(54) TRANSMITTER-RECEIVER FOR ELECTRONIC MAIL THAT PROVIDES CONVENIENCE TO A USER RECEIVING MAIL SERVICES FROM VARIOUS MAIL SERVICE PROVIDERS AT DIFFERENT TERMINALS AND DIFFERENT PLACES

(75) Inventors: Yasuhide Horiuchi, Tokyo; Satoshi Terasaki, Oomiya, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,561

(22) Filed: Jun. 12, 1997

(30) Foreign Application Priority Data

Jun. 12, 1996 (JP) .................................................... 8-150620

(51) Int. Cl.$^7$ ...................................................... G06F 15/16
(52) U.S. Cl. .......................... 709/206; 709/206; 709/207; 709/223; 709/224
(58) Field of Search .................................... 709/206, 207, 709/224, 223, 245; 379/93.24, 93.15, 100.08, 88.13, 88.12, 88.14, 100.06, 88.27, 88.25, 88.22

(56) References Cited

U.S. PATENT DOCUMENTS

| | | | |
|---|---|---|---|
| 4,713,780 | * 12/1987 | Schultz et al. | 709/206 |
| 4,851,988 | * 7/1989 | Trottier et al. | 709/226 |
| 5,283,887 | 2/1994 | Zachery | 395/500 |
| 5,406,557 | * 4/1995 | Baudoin | 370/407 |
| 5,481,698 | * 1/1996 | Itoh et al. | 714/48 |
| 5,487,100 | * 1/1996 | Kane | 455/31.2 |
| 5,596,720 | * 1/1997 | Hamada et al. | 709/206 |
| 5,608,786 | * 3/1997 | Gordon | 379/100 |
| 5,647,002 | * 7/1997 | Brunson | 709/206 |
| 5,737,395 | * 4/1998 | Irribarren | 379/88 |
| 5,742,905 | * 4/1998 | Pepe et al. | 455/461 |

(List continued on next page.)

FOREIGN PATENT DOCUMENTS 5-153159 * 6/1993 (JP).

OTHER PUBLICATIONS

Rose et al., RFC 1725, Post Office Protocol—Version 3, May 1996.*

* cited by examiner

Primary Examiner—Mark H. Rinehart
Assistant Examiner—William C. Vaughn, Jr.
(74) Attorney, Agent, or Firm—Israel Gopstein (57) ABSTRACT

The object of the present invention is to provide A transmitter-receiver enables a user to send a mail in an optimal mode even to a portable terminal with lower functional capability without a need for awareness of a plurality of mail service providers. The transmitter-receiver notifies of arrival of the mail at an optimal communication cost depending on the importance of the mail, and unifies a plurality of mail spools. The unified mail spools are controlled by a spool integration unit. The transmitter-receiver according to the present invention comprises a terminal response unit for inquiring capability of a user terminal and a data form converting unit, and the mail is sent in an optimal form to the user terminal. In case the content of the mail cannot be read perfectly, it is designed in such manner that the mail is not deleted from the spool, and arrival of the mail is notified to the user at an optimal communication cost depending on the importance of the mail and position information of the user.

3 Claims, 6 Drawing Sheets

U.S. PATENT DOCUMENTS

| | | | | |
|---|---|---|---|---|
| 5,761,276 | * | 6/1998 | Park | 379/88 |
| 5,818,447 | * | 10/1998 | Wolf et al. | 345/335 |
| 5,838,923 | * | 11/1998 | Lee et al. | 709/236 |
| 5,850,519 | * | 12/1998 | Vazana | 709/206 |
| 5,923,848 | * | 7/1999 | Goodhand et al. | 709/219 |
| 5,928,325 | * | 7/1999 | Shaughnessy et al. | 709/206 |
| 5,930,471 | * | 7/1999 | Milewski et al. | 709/204 |
| 5,956,486 | * | 9/1999 | Hickman et al. | 709/206 |
| 5,983,265 | * | 11/1999 | Martino, II | 709/206 |
| 6,018,760 | * | 1/2000 | Oishi et al. | 709/204 |

| TEXT | IMAGE | MOVING PICTURE | SOUND |
|---|---|---|---|
| ≦30KB | BINARY, ≦320×200 | × | × |

| MAIL NO. | SPOOL NO. | INTRA-SPOOL ID | MAIL ID |
|---|---|---|---|
| 1 | 3 | 1033 | ABC013 |
| 2 | 1 | 59 | XYZ989 |
| 2 | 2 | 304 | XYZ989 |
| 3 | 1 | 1034 | TUA193 |

FIG. 7

| MAIL NO. | TEXT | MOVING PICTURE | INFORMATION DEFECT FLAG |
|---|---|---|---|
| 2 | 40KB | 160 × 100 PIXELS 100 FRAMES | ✓ |

USER 1001

| URGENCY | TRANSMITTING METHOD |
|---------|---------------------|
| 1 | A. B. C |
| 2 | B. C |
| 3 | C |
| 4 | NOT REQUIRED |
| 5 | NOT REQUIRED |

FIG. 10

USER 1001

| COMMUNICATION METHOD | REGISTERED POSITION |
|----------------------|---------------------|
| A | X |
| B | – |
| C | – |
| D | Y |

TRANSMITTER-RECEIVER FOR ELECTRONIC MAIL THAT PROVIDES CONVENIENCE TO A USER RECEIVING MAIL SERVICES FROM VARIOUS MAIL SERVICE PROVIDERS AT DIFFERENT TERMINALS AND DIFFERENT PLACES

BACKGROUND OF THE INVENTION

1. Field of the Invention

The present invention relates to a transmitter-receiver for electronic mail system, and in particular to a transmitter-receiver, which can provide convenience when a user receives services from various mail service providers at different terminals and at different places.

2. Description of the Related Art

In recent years, possibilities have generally increased for individual users to receive electronic mail services from a plurality of mail service providers through personal computer communication, Internet, etc. With rapid propagation of personal computers and portable information terminals, types of terminals to receive electronic mail (hereinafter simply referred as "mail") and places to receive the mail are now much more diversified than before depending on individual users or situations.

However, in case a user receives a plurality of mail services, mail must be received through a different procedure for each service, and this causes much inconvenience to the user. Further, in case the same mail is distributed to the user via a plurality of services, each time the user utilizes any of these services, the user is compelled to read the same mail, and this is also inconvenient to the user.

In case the mail is read at a terminal with relatively low display capability such as a portable information terminal, content of some of the mails may not be correctly displayed or the mail may be deleted from a spool, which serves as a storage unit to retain the mail, although the user has not yet read the mail.

Also, it often happens that there is no function to notify the arrival of the mail to a user which is not connected to a mail system, and it is necessary for the user to connect to the mail system regularly, or that the user cannot receive notice of arrival because the notice can only be given through a single communication method although there is a function to notify arrival of the mail, or that a mail with lower importance may also be notified and this results in higher communication cost.

SUMMARY OF THE INVENTION

To solve the above problems, it is an object of the present invention to provide a transmitter-receiver for electronic mail system, by which mails from a plurality of mail service providers are offered as a single service in appearance and a user can utilize electronic mail without being conscious of the service providers.

It is another object of the present invention to provide a transmitter-receiver for electronic mail system, by which content of the mail is converted depending on a terminal which the user utilizes and information can be sent to the user in an optimal form.

It is still another object of the present invention to provide a transmitter-receiver for electronic mail system, in which arrival of the mail is notified to the user through various communication channels depending on the importance of the mail and the notice of the arrival of the mail can be given at high reliability and at reasonable communication cost.

In the transmitter-receiver for electronic mail system according to the present invention, a plurality of mail spools are regarded and operated as a single spool by the use of a spool integration unit and the user can utilize the mail without being conscious of the service providers.

Also, the transmitter-receiver for electronic mail system according to the present invention comprises a terminal response unit for receiving communication of a user terminal and acquiring capability of the user terminal and a data form converting unit for converting content of the mail to various forms, whereby the content of the mail is converted depending on the terminal which the user utilizes and information can be transmitted in an optimal form.

Further, the transmitter-receiver for electronic mail system according to the present invention comprises a mail urgency acquiring unit for checking urgency of the mail in a mail spool, a mail arrival notifying unit for notifying arrival of mail to the user based on urgency of the mail, and a position information control unit for searching and controlling a place where the user is currently present, so that mode of communication is selected according to the importance of the mail and position information of the user, and arrival of the mail is notified, thus providing notice of arrival of the mail with high reliability and at optimal communication cost.

BRIEF DESCRIPTION OF THE DRAWINGS

These objects and features of the present invention will become more readily apparent from the following detailed description of the preferred embodiments taken in conjunction with the accompanying drawings in which.

DETAILED DESCRIPTION OF THE INVENTION

In the following, description will be given of an embodiment of a the present invention referring to the attached drawings.

Figure 1:
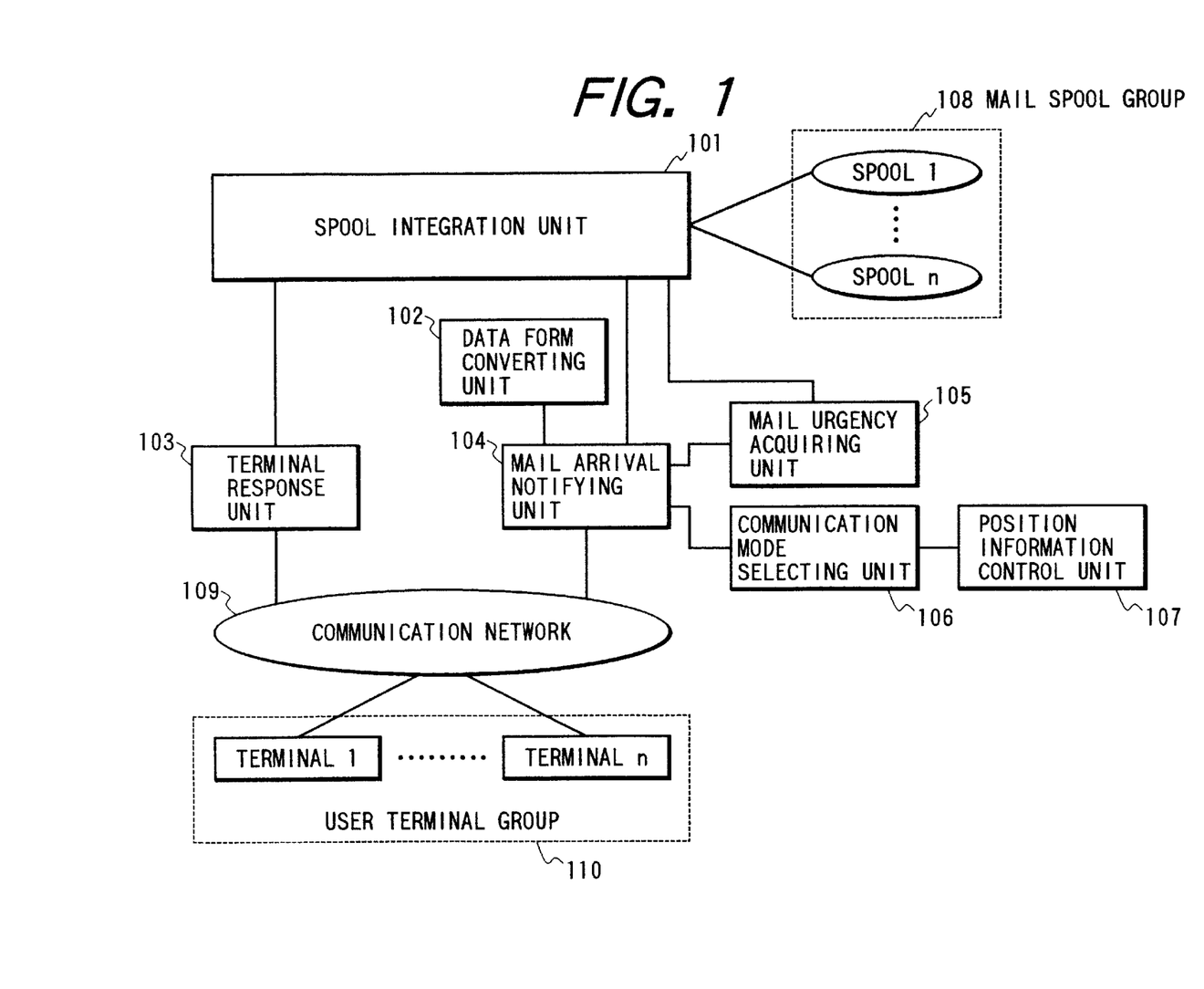
FIG. 1 is a system block diagram of an embodiment of the present invention.

FIG. 1 is a block diagram of system configuration of an embodiment of the present invention. In FIG. 1, the system comprises a spool integration unit 101 for integrating a plurality of spools serving as a plurality of storage means and for making it possible to have access to the plurality of spools by regarding the plurality of spools as a single spool, a data form converting unit 102 for converting various data such as text, image, etc. included in the mail to data of different forms, a terminal response unit 103 for receiving connection from a terminal which the user utilizes, for acquiring user validation and terminal capability and for transmitting the mail to the terminal, a mail the user of arrival notifying unit 104 for notifying arrival of the mail, a mail urgency acquiring unit 105 for checking urgency of the mail in a mail spool, a communication mode selecting unit 106 for selecting which communication channel should be used to notify arrival of the mail to the user, a position information control unit 107 for controlling information of communication channel to which the user can have access, and a mail spool group 108 connected by various types of communication channels by a known method of access and having mail spools by a plurality of mail service providers, whereby the system is connected to a user terminal group 110 having various terminals which the user can utilize via a communication channel network 109 consisting of various types of communication channels, which include wired or wireless lines. Each of the units 101 to 107 of the present system can be implemented by CPU, memory, interface, etc.

First, description will be given of a case where the user acquires a mail summary through a certain terminal. Using a terminal readily available, the user tries to connect to the system. The terminal is connected to the terminal response unit 103 via a type of communication channel of the communication channel network 109.

Figure 2:
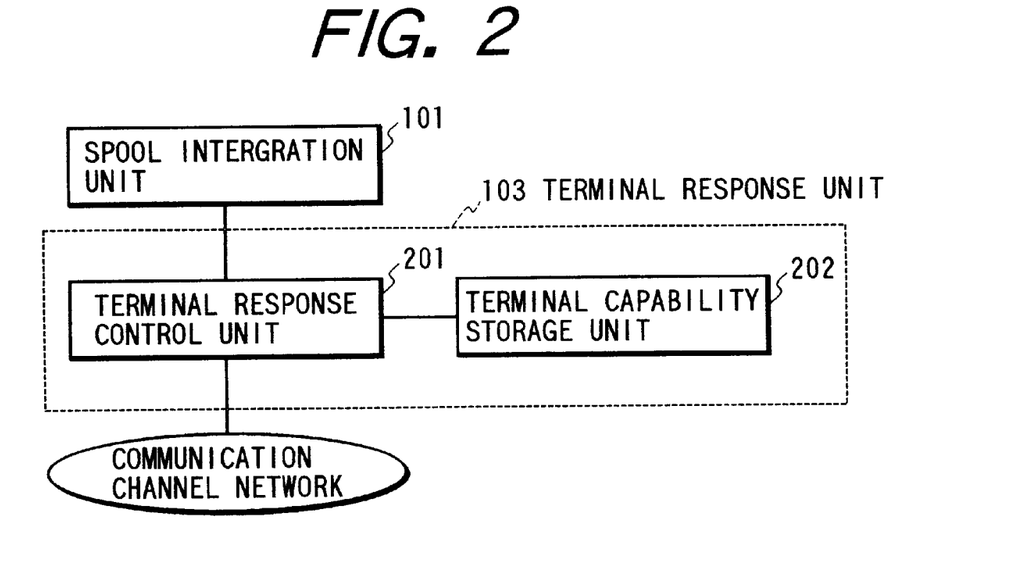
FIG. 2 represents a block diagram of a terminal response unit in the embodiment of the present invention.

FIG. 2 is a block diagram of a terminal response unit 103 of the present embodiment. In FIG. 2, the terminal response unit 103 comprises a terminal response control unit 201 for controlling its operation and a terminal capability storage unit 202 for retaining capability of the terminal during communication.

To the terminal which seeks connection, the terminal response control unit 201 checks validation and specifies the user. Further, by a protocol already determined, it inquires capability of the terminal and stores the information of capability thus obtained at the terminal capability storage unit 202.

The methods to acquire terminal capability include a method to make inquiries on function, which the terminal response control unit 201 requires for each communication and a method to refer to a correspondence table of terminal name and capability, which is retained by the terminal response control unit 201 in advance by sending a terminal name from the terminal.

Figure 3:
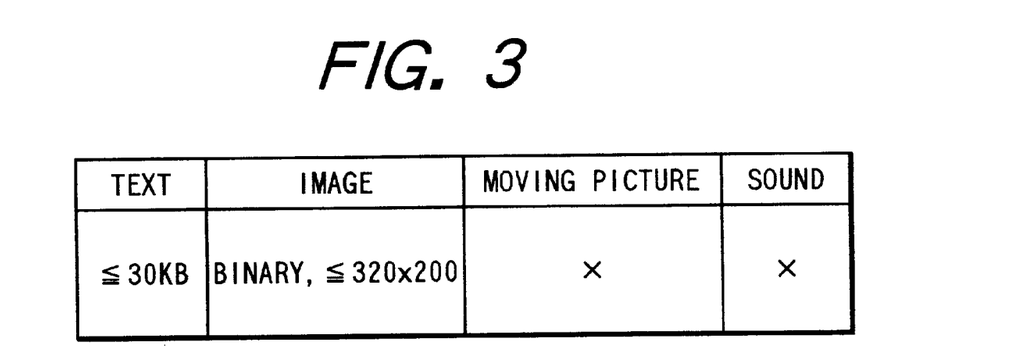
FIG. 3 shows an example of a terminal capability table in the embodiment of the present invention.

FIG. 3 is an example of terminal capability stored at the terminal capability storage unit 202 in the present embodiment. In this example, it is indicated that the terminal has a capability to receive and display a text of 30 KB or less and also a capability to receive and display an image of up to 320×200 pixels in binary.

When the user inputs a command to indicate a summary of mails, the terminal response control unit 201 sends user information and a command to display the mail summary to the spool integration unit 101.

Figure 4:
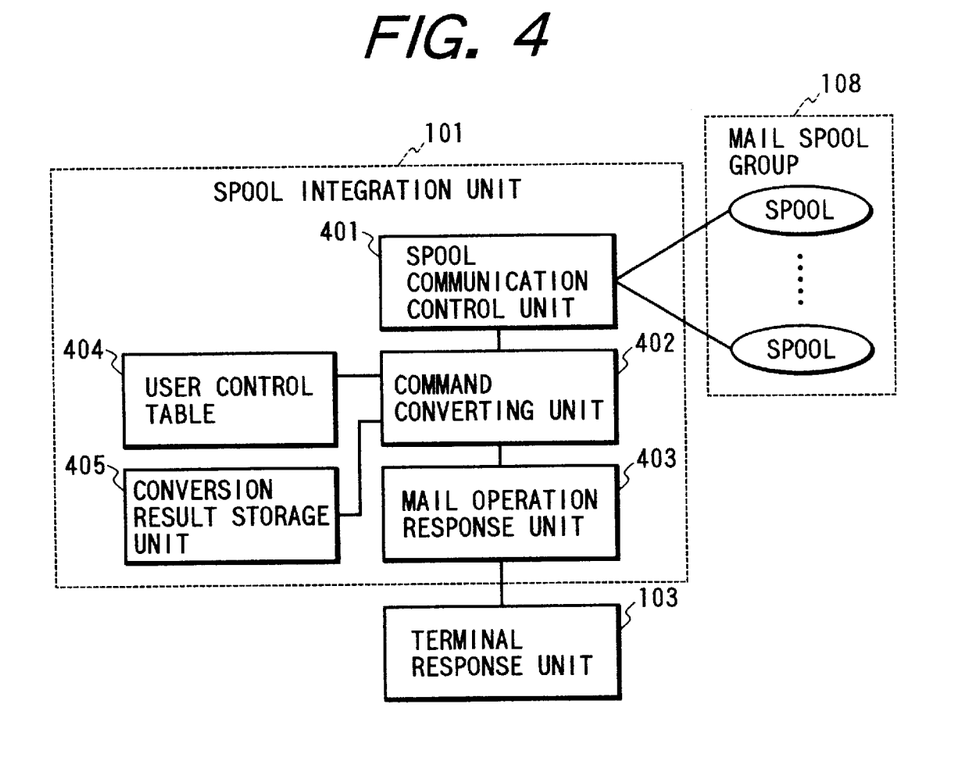
FIG. 4 is a block diagram of a spool integration unit in the embodiment of the present invention.

FIG. 4 is a block diagram of the spool integration unit 101 in the present embodiment. In FIG. 4, the spool integration unit 101 comprises a spool communication control unit 401 for performing communication with a plurality of spools, a command converting unit 402 for converting a command to a single spool to a command to a plurality of spools, a mail operation response unit 403 for receiving a command to spool and for returning the result, a user control table 404 for storing the spool which the user utilizes and information necessary for the utilization, and a conversion result storage unit 405 for storing the result of conversion of the command converting unit 402 for the subsequent operation.

The command from the terminal response unit 103 is received by the mail operation response unit 403, and it is sent to the command converting unit 402. The command converting unit 402 refers to the user control table 404 and converts the command to a command group to a plurality of spools.

Figure 5:
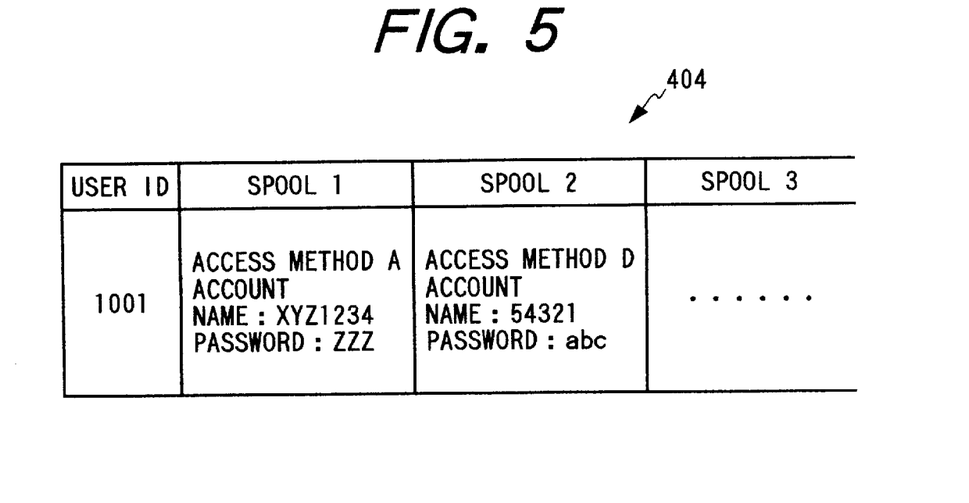
FIG. 5 shows an example of a user control table in the embodiment of the present invention.

FIG. 5 shows an example of the user control table 404 of the present embodiment. In the user control table 404, a method to have access to the spool which the user utilizes and information necessary for such access are registered in advance. In case of a summary display command, the command converting unit 402 converts the mail summary display command to a summary display command to each spool registered.

The converted command is sent to each spool via the spool communication control unit 401. The summary information obtained from each spool is collected at the command converting unit 402 from the spool communication control unit 401.

Figure 6:
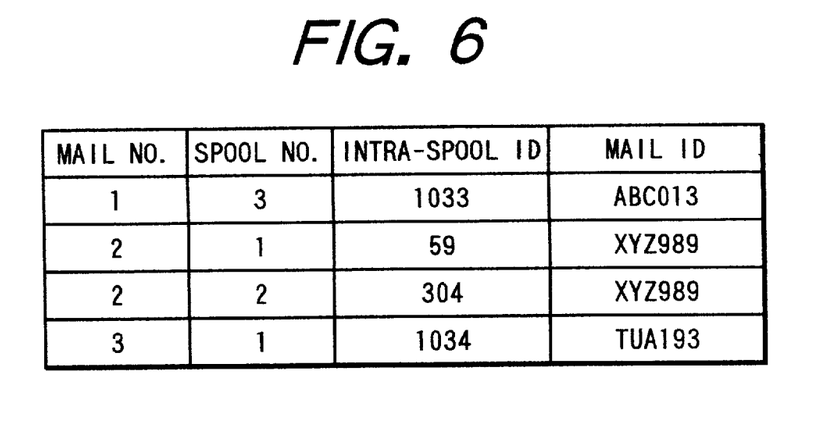
FIG. 6 shows an example of a mail summary information table in the embodiment of the present invention.

FIG. 6 is an example of a summary information thus obtained. In the present system, a mail number represents a number used to specify a specific mail, a spool number is a number to indicate a spool where the mail is present, an intra-spool ID is an ID to gain access to the mail, and a mail ID is a unique identifier to be added to the mail on the mail transmitting side. The information of FIG. 6 is recorded on the conversion result retaining unit 405 to process the subsequent operation command from the user.

The mail number exempting the duplication of FIG. 6 and the title of the mail used for summary display of the mail are sent to the terminal response unit 103 via the mail operation response unit 403. The terminal response unit 103 sends the list to the terminal via the communication channel network 109 and completes processing of the mail summary display command.

By the above procedure, even in case the user receives a plurality of mail services, the user can utilize the mails by simple operation without being conscious of a method to utilize each of the services.

Figure 8:
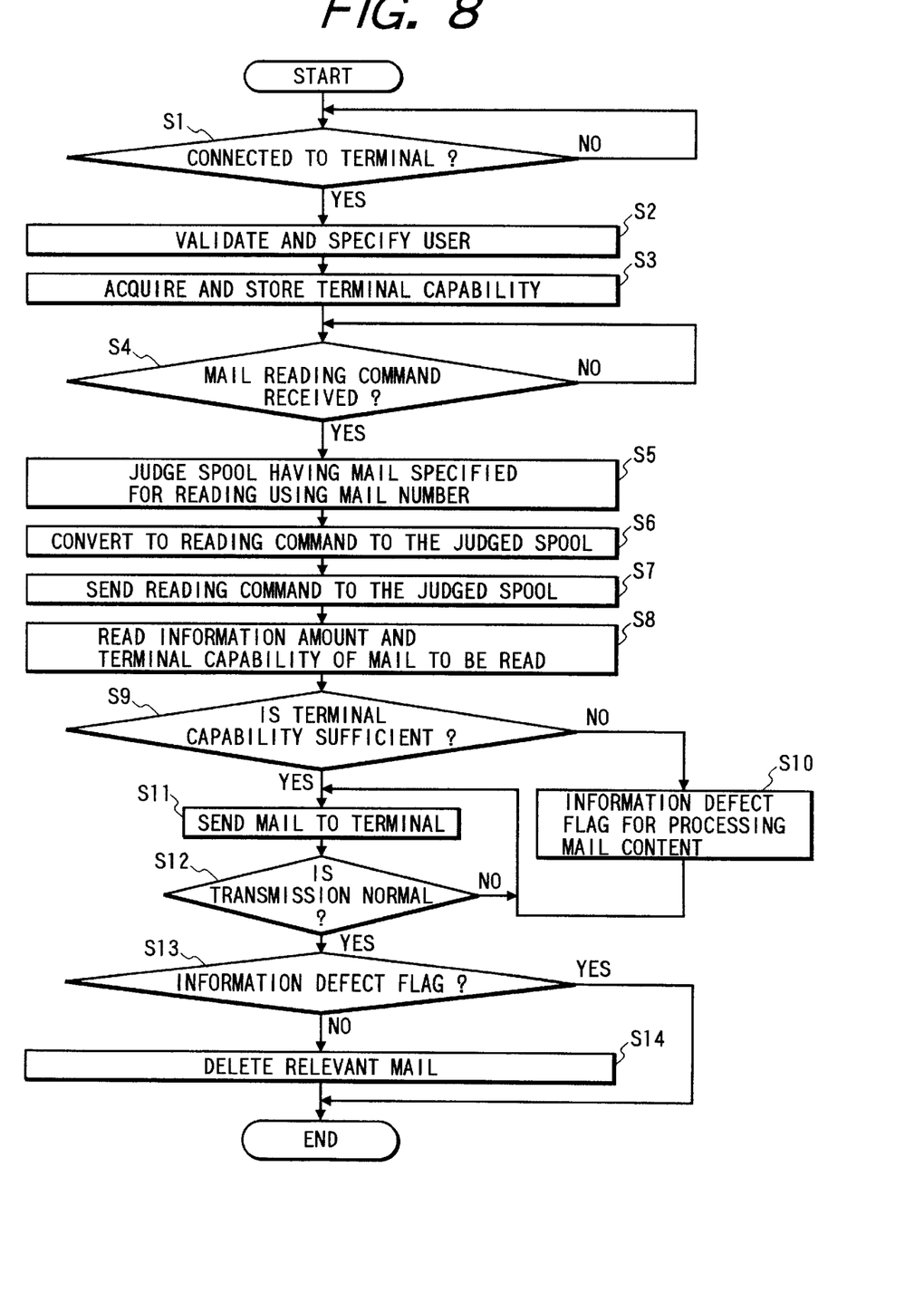
FIG. 8 is a flow chart of processing procedure in case a mail is read from a terminal in the embodiment of the present invention.

Next, description will be given on operation in case the user gains access from a certain terminal and reads a mail and deletes this mail from spool. To simplify the explanation, it is supposed that the user has already received a summary of the mail by said mail summary display command. FIG. 8 is a flow chart of operation procedure and indicates operation in case major portion of the spool integration unit 101 of FIG. 4 is implemented with CPU. First, when it is confirmed that the spool integration unit 101 is connected to the terminal via the terminal response unit 103 (Step S1), validation and designation of the user are performed as described above (Step S2). Then, the capability of the terminal is acquired and retained (Step S3).

The user selects a mail which the user wants to read from the mail summary and issues a reading command to the mail. Here, the reading command includes the mail number. The reading command is sent to the terminal response unit 103 via the communication channel network 109. The terminal response unit 103 sends the reading command to the spool integration unit 101.

Here, the mail operation response unit 403 sends the reading command to the command converting unit 402. Upon receipt of the mail reading command, the command converting unit 402 judges in which spool the mail specified for reading is present based on the information of FIG. 6 recorded in the conversion result retaining unit 405 (Steps S4 and S5) and converts it to a mail reading command to this spool (Step S6). In case the mail specified for reading is a duplicated mail where a plurality of spools are present, it is converted to a reading command to one of these spools (Step S6).

After the conversion, the command is sent to the spool via the spool communication control unit 401 (Step S7), and the result of reading is sent back to the terminal response unit 103 via the mail operation response unit 403 (Step S8).

Figure 7:
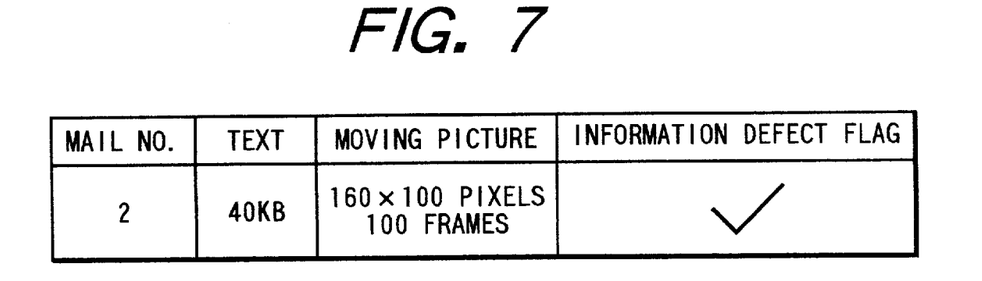
FIG. 7 shows an example of a mail content table in the embodiment of the present invention.

Here, the terminal response unit 103 performs conversion of mail content when necessary. FIG. 7 is an example of a table, which gives content of the mail used by the terminal response unit 103. The terminal response unit 103 refers to the table of FIG. 7 and the capability of FIG. 3. If it is judged that the capability of the terminal is not sufficient to display the mail (Step S9), the content of the mail is processed using the data form converting unit 102, and it is converted to information amount and/or information form to match the capability of the terminal (Step S10).

In the present example, the length of the text is over 30 KB of receiving capability, and it is cut down to the length of 30 KB. Because the terminal cannot display moving picture, a part of the moving picture is converted to an image of 320×200 pixels in binary by the data form converting unit 102 (Step S10).

For example, of 100 frames, 4 frames are converted to a binary image of 320×200 pixels. In this case, if information of the original mail is impaired due to conversion of information amount or information form as in the cut-down of text or in the conversion of moving picture to still picture, the terminal response unit 103 puts an information defect flag to the table of FIG. 7 (Step S10). As an example of conversion which does not impair information, there is a case where the entire text is converted as an image in order to transmit content of the text to a terminal where only the image can be displayed.

The terminal response unit 103 sends the mail thus converted to the user terminal via the communication channel network 109 (Step S11). In this case, with regard to the mail with the information defect flag, its information is also sent to the user terminal, and it is notified that all of the information of the received mail has not been read. For example, the terminal adds a description such as "there may be the information lost" to the title of the mail.

In case the content of the mail could be normally transmitted to user terminal (Step S12), the terminal response unit 103 starts to delete the mail. First, the table of FIG. 7 is referred. If there is an information defect flag, no deletion is performed (Step S13). If there is no information defect flag, FIG. 6 is referred, and a deletion instruction is generated to all of the spools where the mail is present, and it is sent to the spool group via the spool communication control unit 401 (Step S14).

By the above procedure, the user can read the mail in a form matching the capability of the terminal which the user currently utilizes. In case the terminal utilized by the user cannot receive all of the content of the mail, the mail is not deleted, and the user can read the perfect mail content at a terminal having higher capability later.

Because all of the mails, which are identical with each other and arrive at a plurality of spools which the user utilizes, are deleted at the time when the user receives the perfect content of the mail, and this eliminates inconveniences that the same mail is read by many times.

Next, description will be given on a case where arrival of the mail is notified to a user. The mail arrival notifying unit 104 judges whether a mail is present or not, of which the arrival should be notified to the user, at a given time interval. The mail arrival notifying unit 104 inquires the mail urgency acquiring unit 105 whether a mail with urgency to notify the arrival has arrived or not. The mail urgency acquiring unit 105 acquires the mail summary by sending a mail summary command to the spool integration unit 101.

Figure 9:
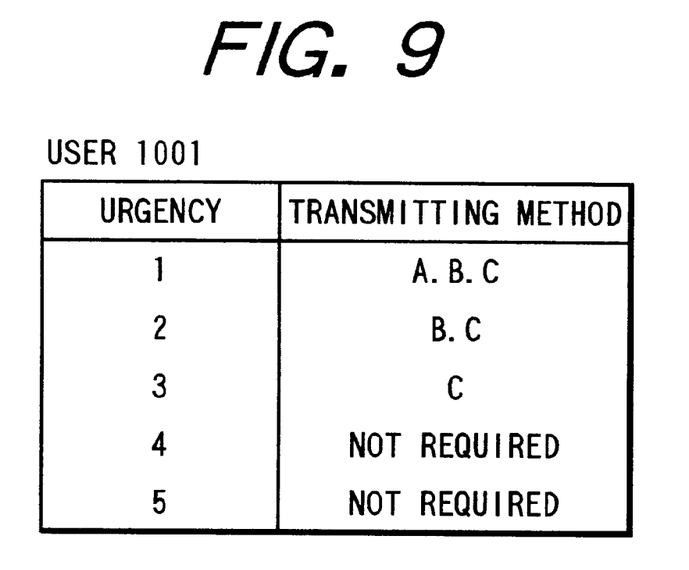
FIG. 9 is an example of a correspondence table of mail urgency and transmitting method in the embodiment of the present invention.

FIG. 9 represents a correspondence table of mail urgency and transmitting method of the mail to a certain user as used in the mail urgency acquiring unit 105 of the present embodiment. From this table and the mail summary acquired, a mail is extracted, which requires arrival notification, and a list including a set of mail number and transmitting method and information such as the title necessary for arrival notification is sent back to the mail arrival notifying unit 104.

The mail arrival notifying unit 104 extracts only the transmitting method from this list and sends it to the communication mode selecting unit 106.

Figure 10:
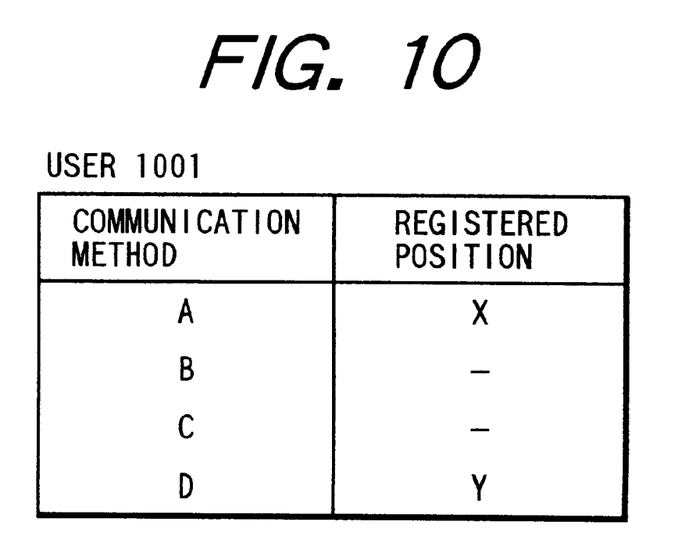
FIG. 10 is an example of a user position information in the embodiment of the present invention.

FIG. 10 shows an example of position information which the position information control unit 107 of the present embodiment has, and it includes communication method to a certain user and information of a position where it is estimated that the user has been present recently among the places where communication can be utilized. For example, in PHS telephone network, this table can be prepared based on a position registration information of a PHS terminal which the user has. The symbol "-" in the registration position column indicates that it is a communication method where it is not possible to specify at which position the user is present as in the case of a normal portable telephone set.

The communication mode selecting unit 106 approximately calculates the cost in case each communication channel is used according to the position information and sends back the list of transmitting methods sent from the mail arrival notifying unit 104 to the mail arrival notifying unit 104 by re-arranging them in the order from the lower cost.

In the communication mode selecting unit 106, transmitting method may be selected by considering reliability and high speed property of each transmitting method. Based on the list of the re-arranged transmitting methods, the mail arrival notifying unit 104 notifies the arrival of the mail to the user via the communication channel network 109.

By the above procedure, it is possible to notify only the information relating to an important mail, which deserves to notify to the user, to the user via an optimal channel. As described above, it is possible according to the present invention to provide an electronic mail system, which the user can utilize without being conscious of the service providers because the mails by a plurality of mail service providers are offered as a single service in appearance.

By converting the content of the mail depending upon the terminal which the user utilizes, it is possible to offer an electronic mail system, by which the information can be sent to the user in an optimal mode. Also, it is possible to offer an electronic mail system which the user can utilize at a reasonable communication cost because arrival notification to the user can be given via an optimal communication channel depending on importance of each mail.

What is claimed is:

1. A transmitter-receiver for transmitting and receiving mails to and from a user terminal by an electronic mail system, comprising:

a plurality of mail spools for retaining mails transmitted from said user terminal, each of said mail spools having a spool number, wherein each mail in said mail spools is managed in accordance with said spool number and a mail number assigned to said mails; and a spool integration unit for integrating said plurality of mail spools and for making it possible to gain access to each of said mail by regarding said plurality of mail spools as a single spool, said spool integration unit including:

means for determining, among said plurality of mail spools, any mail spools where a mail designated to be read out is stored,     means for converting a reading command for reading out a mail from a single spool into a reading command for reading out a mail from each of said spools which have been determined by said means for determining,     further means for determining whether or not plural mails retained in said plurality of mail spools have a same mail ID given by a transmitter, and     means for assigning the same mail number to plural identical mails having the same mail ID.

2. A transmitter-receiver according to claim 1, wherein said spool integration unit comprises further means for converting the reading command to a reading command for reading out a mail from only one of the plurality of spools which have been determined by said means for determining in case two or more spools where mails designated for reading are present.

3. A transmitter-receiver according to claim 1, further comprising a position information control unit having information relating to positions and communication channels accessible by the user; and     communication mode selecting means for selecting which communication channel the user should use for communication based on the information from the position information control unit to provide control information for a communication channel which the user can access by recording a place where the user having said user terminal is currently present.

\* \* \* \* \*